US011400907B2

(12) United States Patent
Krautter et al.

(10) Patent No.: US 11,400,907 B2
(45) Date of Patent: Aug. 2, 2022

(54) METHOD FOR AVOIDING AN EXCEEDANCE OF A PERMISSIBLE MAXIMUM PRESSURE OF A HYDRAULIC VEHICLE POWER BRAKING SYSTEM INCLUDING ANTI-SLIP REGULATION

(71) Applicant: Robert Bosch GmbH, Stuttgart (DE)

(72) Inventors: Andreas Krautter, Steinheim (DE); Bertram Foitzik, Ilsfeld (DE); Daniel Frank, Kleinsachsenheim (DE); Dirk Foerch, Neuenstadt/Stein (DE); Michael Bunk, Leingarten (DE)

(73) Assignee: Robert Bosch GmbH, Stuttgart (DE)

( * ) Notice: Subject to any disclaimer, the term of this patent is extended or adjusted under 35 U.S.C. 154(b) by 116 days.

(21) Appl. No.: 16/641,084

(22) PCT Filed: Jul. 19, 2018

(86) PCT No.: PCT/EP2018/069625
§ 371 (c)(1),
(2) Date: Feb. 21, 2020

(87) PCT Pub. No.: WO2019/037966
PCT Pub. Date: Feb. 28, 2019

(65) Prior Publication Data
US 2020/0172074 A1 Jun. 4, 2020

(30) Foreign Application Priority Data
Aug. 24, 2017 (DE) .......................... 102017214858.6

(51) Int. Cl.
*B60T 13/68* (2006.01)
*B60T 13/14* (2006.01)
(Continued)

(52) U.S. Cl.
CPC .......... *B60T 13/686* (2013.01); *B60T 13/147* (2013.01); *B60T 13/662* (2013.01); *B60T 8/344* (2013.01); *B60T 8/3655* (2013.01)

(58) Field of Classification Search
CPC .... B60T 13/686; B60T 8/3655; B60T 13/662; B60T 13/147; B60T 8/344
See application file for complete search history.

(56) References Cited

U.S. PATENT DOCUMENTS 5,100,210 A * 3/1992 Buschmann .............. B60T 8/00
303/113.4
5,876,102 A * 3/1999 Mori ....................... B60T 8/173
303/156

(Continued)

FOREIGN PATENT DOCUMENTS

CN 101331043 A 12/2008
CN 102529929 A 7/2012

(Continued)

OTHER PUBLICATIONS

International Search Report for PCT/EP2018/069625, dated Oct. 1, 2018.

*Primary Examiner* — Pamela Rodriguez
(74) *Attorney, Agent, or Firm* — Norton Rose Fulbright US LLP; Gerard Messina

(57) ABSTRACT

To avoid an exceedance of a permissible maximum pressure in a hydraulic vehicle power braking system including anti-slip regulation, continuous valves are to be utilized as inlet valves of wheel brakes of the vehicle braking system, and the inlet valve of a wheel brake, whose outlet valve will be opened or is open in order to regulate the wheel brake pressure, is to be partially closed, so that this inlet valve acts as a throttle and limits a brake pressure in the vehicle braking system.

20 Claims, 1 Drawing Sheet

(51) Int. Cl.
*B60T 13/66* (2006.01)
*B60T 8/34* (2006.01)
*B60T 8/36* (2006.01)

(56) References Cited

U.S. PATENT DOCUMENTS

| | | | |
|---|---|---|---|
| 2014/0152082 A1* | 6/2014 | Strengert | B60T 8/4872 |
| | | | 303/3 |
| 2015/0027113 A1 | 1/2015 | Biller | |
| 2016/0059706 A1* | 3/2016 | Kunz | B60L 7/26 |
| | | | 303/3 |
| 2017/0320477 A1* | 11/2017 | Burkhard | B60T 8/4081 |
| 2020/0223415 A1* | 7/2020 | Foerch | B60T 13/146 |

FOREIGN PATENT DOCUMENTS

| | | |
|---|---|---|
| CN | 103702874 A | 4/2014 |
| DE | 3742172 A1 | 6/1989 |
| DE | 19548207 A1 | 6/1997 |
| DE | 102015201331 A1 | 7/2016 |
| JP | 2002029405 A | 1/2002 |
| WO | 2013131806 A1 | 9/2013 |

\* cited by examiner

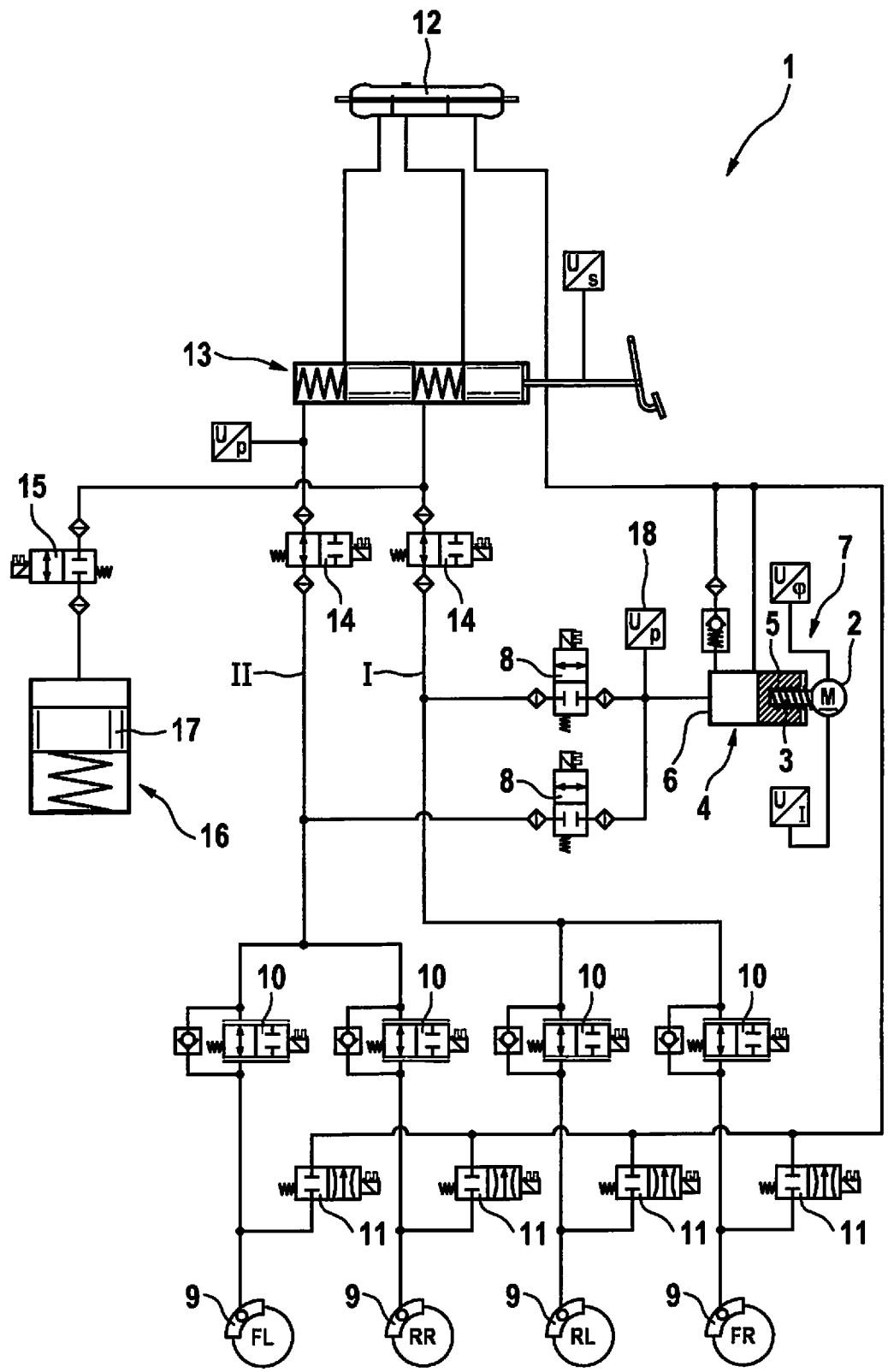

METHOD FOR AVOIDING AN EXCEEDANCE OF A PERMISSIBLE MAXIMUM PRESSURE OF A HYDRAULIC VEHICLE POWER BRAKING SYSTEM INCLUDING ANTI-SLIP REGULATION

FIELD

The present invention relates to a method for avoiding an exceedance of a permissible maximum pressure of a hydraulic vehicle power braking system including anti-slip regulation. A brake pressure in the vehicle braking system is to be avoided, which may damage or destroy the vehicle braking system or parts of the vehicle braking system. A mechanical overload, damage, or destruction of the vehicle braking system or parts of the vehicle braking system, for example, a power pressure generator, is/are also to be avoided.

BACKGROUND INFORMATION

German Patent Application No. DE 10 2015 201 331 A1 describes a method for limiting a brake pressure in a hydraulic vehicle power braking system including anti-slip regulation. The vehicle braking system includes a piston-cylinder unit, which is drivable with the aid of an electric motor via a threaded drive, as a power pressure generator, to which hydraulic wheel brakes are connected via solenoid valves as inlet valves. The wheel brakes are connected, via solenoid valves as outlet valves, to a pressureless brake fluid reservoir of the vehicle braking system, to which a muscle power-actuatable main brake cylinder is also connected, which is utilized during a power braking as a setpoint device and which, during a power braking, is hydraulically disconnected from the vehicle braking system by closing a shut-off valve in every brake circuit. A piston-cylinder unit including a spring-loaded piston is utilized as a pedal travel simulator in which the main brake cylinder may displace brake fluid during a power braking. The vehicle braking system may be actuated with the aid of the main brake cylinder in order to carry out an auxiliary brake application in the event of failure of the power pressure generator or any other error.

In order to avoid an exceedance of a permissible maximum pressure in the vehicle braking system during generation of brake pressure with the aid of the power pressure generator for a power braking, the aforementioned unexamined patent application provides that the electric motor of the power pressure generator is switched off, the outlet valve of one wheel brake is at least partially opened and its inlet valve is held open, and the inlet valves of the remaining wheel brakes are closed. As a result, brake fluid flows out of the vehicle braking system through the open inlet valve and the open outlet valve of a wheel brake into the pressureless brake fluid reservoir. This avoids or reduces at least one pressure increase in the vehicle braking system due to an overrun of the switched-off power pressure generator. "Overrun" means a continued movement of the electric motor, threaded drive, and piston due to the kinetic energy of their moving masses after an energization of the electric motor has been switched off. The known method violates the principle of never simultaneously opening the inlet valve and the outlet valve of a wheel brake, but rather to always close at least the outlet valve or the inlet valve, or to keep it closed.

SUMMARY

An example method according to the present invention is provided for avoiding an exceedance of a permissible maximum pressure of a hydraulic vehicle power braking system, which includes anti-slip regulation. The example method according to the present invention protects the vehicle braking system against damage or destruction by a brake pressure, which is generated by a power pressure generator, in that the vehicle braking system limits the brake pressure and/or halts or limits its increase.

The hydraulic vehicle power braking system includes a power pressure generator, to which hydraulic wheel brakes are connected via inlet valves. The power pressure generator includes, in particular, an electric motor, a threaded drive, and a piston-cylinder unit, which is drivable via the threaded drive with the aid of the electric motor, i.e., its piston is displaceable in the cylinder. The wheel brakes are connected to a brake fluid reservoir via outlet valves. The inlet valves and the outlet valves are, in particular, solenoid valves and the inlet valves and, preferably, also the outlet valves are continuous valves. "Continuous valve" means that the valves not only have the positions "open" and "closed," but rather also allow for any partially open or closed position between "open" and "closed." A partially open or closed continuous valve may be understood to be a controllable throttle, whose flow resistance is controllable.

The brake fluid reservoir is preferably pressureless; it is, in particular, a brake fluid reservoir of a muscle power- or auxiliary power-actuatable main brake cylinder. "Auxiliary power" means an actuation with the aid of muscle power amplified by a brake booster. Auxiliary power is to be differentiated from an auxiliary brake application carried out by actuating the main brake cylinder in the event of failure of the power pressure generator or any other malfunction of the vehicle braking system.

The inlet valves and outlet valves of the wheel brakes are part of an anti-slip regulation of the vehicle braking system; with the aid thereof, wheel brake pressures in every wheel brake may be individually regulated, where a regulation is also to be understood to be a control. With the aid of the inlet valves and the outlet valves, a wheel brake pressure regulation is also possible, in particular, during a power braking without and with anti-slip regulation. "Wheel brake pressure regulation" means that wheel brake pressures in the wheel brakes are regulated according to a setpoint value. A wheel brake pressure regulation is also possible, during a power braking, with the aid of the power pressure generator.

In order to avoid an exceedance of the permissible maximum pressure during a generation of brake pressure for a power braking with the aid of the power pressure generator, the present invention provides that an inlet valve of a wheel brake is to be partially closed, and its outlet valve is to be opened or is already open, for example, due to an anti-slip regulation or a wheel brake pressure regulation. The inlet valve is partially closed if it was previously open. If the inlet valve was previously closed, it is partially opened, which leads to the same result of a partially closed or partially open inlet valve. Multiple or all inlet valves may also be partially opened. Preferably, only one inlet valve is partially opened or partially closed, because, normally, the brake pressure in the vehicle braking system is not to be reduced.

Due to the partial closing of the inlet valve of a wheel brake, whose outlet valve will be opened or is open, a brake pressure increase in the vehicle braking system may be halted and/or the brake pressure in the vehicle braking system may be limited. At the same time, a brake pressure drop or a brake pressure drop below an intended brake pressure is avoided, in that the inlet valve is closed to such an extent, or is opened only to such an extent that the brake pressure in the vehicle braking system generated with the aid of the power pressure generator does not drop or does not drop below an intended brake pressure. The power pressure generator is preferably switched off. A further brake pressure increase due to an overrun of the power pressure generator is halted or prevented with the aid of the method according to the present invention.

In the example method according to the present invention, the inlet valve of a wheel brake, whose outlet valve will be opened or is open, is not entirely closed but is partially closed.

Advantageous embodiments and refinements of the present invention are described herein.

BRIEF DESCRIPTION OF THE DRAWING

The FIGURE shows a hydraulic circuit diagram of a hydraulic vehicle power braking system including anti-slip regulation.

DETAILED DESCRIPTION OF EXAMPLE EMBODIMENTS

An example method according to the present invention is explained below with reference to a hydraulic circuit diagram of a hydraulic vehicle power braking system including anti-slip regulation, which is represented in the FIGURE.

The FIGURE shows a hydraulic vehicle power braking system 1 including anti-slip regulation. It includes an electric motor 2, a threaded drive 3, and a piston-cylinder unit 4, whose piston 5 is displaceable in a cylinder 6 with the aid of electric motor 2 via threaded drive 3, as a power pressure generator 7. During a service braking, which is carried out as a power braking, power pressure generator 7 generates a brake pressure. Cylinder 6 of power pressure generator 7 is connected to vehicle braking system 1 via power brake valves 8. A power brake valve 8 is provided for each brake circuit I, II; illustrated vehicle braking system 1 includes two brake circuits I, II, which are hydraulically separated from each other.

Vehicle braking system 1 includes four hydraulic wheel brakes 9, each of which is connected to power brake valves 8 via an inlet valve 10 and to a brake fluid reservoir 12 via an outlet valve 11. In the FIGURE, brake fluid reservoir 12 is pressureless. Two wheel brakes 9 are assigned to one respective brake circuit I, II. A wheel brake pressure is individually regulatable in every wheel brake 9 with the aid of inlet valves 10 and outlet valves 11. A wheel brake pressure regulation takes place during a power braking without anti-slip regulation as well as during an anti-slip regulation. Inlet valves 10 and outlet valves 11 form a wheel brake pressure regulation valve system and may be understood to be anti-slip regulation or part of an anti-slip regulation. A wheel brake pressure regulation without anti-slip regulation means a regulation of the wheel brake pressures in wheel brakes 9 according to a setpoint value. Anti-slip regulations are, for example, an anti-lock system, drive slip regulation, vehicle dynamics regulation, and an electronic stability program, for which the abbreviations ABS, ASR, VDC, and ESP are common. Such anti-slip regulations are known and are not explained further here. The number of two brake circuits I, II and four wheel brakes 9 is not at all mandatory for the present invention, as is also the case for the assignment of two wheel brakes 9 to each brake circuit I, II. There may be one, two, or more wheel brakes 9 present in each brake circuit I, II and/or vehicle braking system 1 may include one, two, or more brake circuits I, II.

Vehicle braking system 1 includes a muscle power-actuatable, two-circuit main brake cylinder 13, which is connected via a shut-off valve 14, in each case, between power brake valves 8 and inlet valves 10 to the two brake circuits I, II of vehicle braking system 1. During a service braking, which, as mentioned, is carried out as a power braking, for which power pressure generator 7 generates a brake pressure, main brake cylinder 13 is hydraulically disconnected from vehicle braking system 1 by closing shut-off valves 14 and is utilized as a setpoint device for the wheel brake pressures in wheel brakes 9, which are to be regulated with the aid of inlet valves 10 and outlet valves 11 and/or with the aid of power pressure generator 7.

In the event of a failure of power pressure generator 7 or another error of vehicle braking system 1, shut-off valves 14 remain open and vehicle braking system 1 is actuated with the aid of main brake cylinder 13 in order to carry out a so-called auxiliary brake application.

A pedal travel simulator 16 is connected to a chamber of main brake cylinder 13 via a simulator valve 15. Pedal travel simulator 16 includes a piston-cylinder unit including a spring-loaded piston 17 and allows for piston travel and for pedal travel at main brake cylinder 13 when main brake cylinder 13 is hydraulically disconnected from vehicle braking system 1, during a service braking, by closing shut-off valves 14.

Inlet valves 10 are 2/2-continuous solenoid valves and remaining valves 8, 11, 14, 15 are 2/2-switching solenoid valves, inlet valves 10 and shut-off valves 14 being open in their non-energized normal positions and power brake valves 8, outlet valves 11, and simulator valve 15 being closed in their non-energized normal positions. The present invention does not rule out other embodiments. "Continuous valves" means that inlet valves 10 not only have an open position and a closed position, but rather, in addition to the open and closed positions, every intermediate position between the open and closed positions is possible. Switching valves 8, 11, 14, 15 have only one open position and one closed position without intermediate positions.

In order to avoid an impermissibly high brake pressure in vehicle braking system 1 during a power actuation, in which a brake pressure is generated with the aid of power pressure generator 7, the present invention provides that inlet valve 10 of a wheel brake 9 is partially closed, so that it acts as a throttle, and outlet valve 11 of the same wheel brake 9 is opened. Since wheel brake 9 is connected to pressureless brake fluid reservoir 12 via outlet valve 11, the brake pressure in vehicle braking system 1 or in particular brake circuit I, II may be regulated and limited with the aid of inlet valve 10 designed as a continuous valve. In particular, an overrun of electric motor 2 of power pressure generator 7 due to its centrifugal mass may be compensated for with the aid of inlet valve 10, so that the brake pressure in vehicle braking system 1 does not undesirably increase further due to the overrun of electric motor 2.

The overrun of electric motor 2 is its further rotation after its energization has been switched off, due to a momentum of its moving masses. Further moving masses of power pressure generator 7 may contribute to the overrun. Preferably, the energization of electric motor 2 of power pressure generator 7 is not only switched off, but rather, a braking current is applied to electric motor 2 up to the point of standstill, i.e., electric motor 2 is energized in such a way that it generates a braking torque directed counter to its rotation in order to bring itself, threaded drive 3, and piston 5 of piston-cylinder unit 4 of power pressure generator 7 to a standstill preferably quickly and to keep the overrun short.

Preferably, in each brake circuit I, II, an inlet valve 10 is partially closed and associated outlet valve 11 is open. Power brake valves 8 remain preferably open, because an overrun of power pressure generator 7 would otherwise effectuate an undesirable, very considerable pressure increase in power pressure generator 7.

An opening width of inlet valve 10, which acts as a controllable throttle and whose associated outlet valve 11 is opened in order to limit the brake pressure in vehicle braking system 1, is preferably adjusted depending on a pressure difference between a brake pressure in vehicle braking system 1 between inlet valves 10, power pressure generator 7 and main brake cylinder 13, on the one hand, and a wheel brake pressure in wheel brake 9, which is connected to inlet valve 10, which is partially closed, on the other hand. The brake pressure between inlet valves 10, power pressure generator 7 and main brake cylinder 13 may be measured with the aid of pressure sensors (not represented) in brake circuits I, II. In the described specific embodiment of the present invention, a pressure in cylinder 6 of piston-cylinder unit 4 of power pressure generator 7 is measured with the aid of a pressure sensor 18.

A wheel brake pressure or wheel brake pressures may be measured with the aid of pressure sensors (not represented) connected to wheel brakes 9. It is also possible, however, to calculate or ascertain the wheel brake pressure in another way, for example, with reference to a characteristic map, on the basis of the pressure or a pressure change in brake circuits I, II or in cylinder 6 of piston-cylinder unit 4 of power pressure generator 7, which is measured with the aid of pressure sensor 18. Due to the high dynamics of the wheel brake pressure, a temporally high-resolution pressure sensor is necessary for the measurement. A calculation or another ascertainment of the wheel brake pressure may therefore be advantageous. A calculation or ascertainment, for example, with reference to a characteristics map, is possible because the dynamic pressure behavior of vehicle braking system 1 is known and calculable or is ascertainable in tests and is storable in a characteristics map.

Inlet valve 10, which is partially closed in order to avoid an impermissibly high pressure in wheel brake 9, is closed, in particular, to such an extent that a brake pressure is reached or maintained in vehicle braking system 1 or in brake circuits I, II due to the overrun of power pressure generator 7, which is at least as high as a maximum setpoint wheel brake pressure in wheel brakes 9. Inlet valve 10 is closed further, in particular, with the aid of power pressure generator 7, which is slowing down and coming to a standstill after the shut-off, or with the aid of a decreasing speed of the brake pressure increase. If power pressure generator 7 is at a standstill and the brake pressure does not continue to increase, inlet valve 10 may be completely closed and preferably associated outlet valve 11 is closed again and inlet valve 10 is opened.

What is claimed is:

1. A method for avoiding an exceedance of a permissible maximum pressure of a hydraulic vehicle power braking system including anti-slip regulation, the vehicle braking system including a power pressure generator, to which multiple hydraulic wheel brakes are connected via respective continuous inlet valves, which are connected via respective outlet valves to a brake fluid reservoir, the method comprising the following steps:
   generating a brake pressure in the vehicle braking system using the power pressure generator, for a power braking and/or for an anti-slip regulation; and from a state in which the respective outlet valve of one of the wheel brakes of the multiple hydraulic wheel brakes is closed and the respective inlet valve of the one of the wheel brakes is in a completely open state, performing a wheel brake pressure regulation by opening the respective outlet valve of the one of the wheel brakes and partially, and not fully, closing the respective inlet valve of the one of the wheel brakes from the completely open state of the respective inlet valve into a partially closed state in which the respective inlet valve remains partially and not fully closed.

2. The method as recited in claim 1, wherein the power pressure generator is decelerated to a standstill while the respective outlet valve of the one of the wheel brakes is open due to the opening of the respective outlet valve of the one of the wheel brakes by which said wheel brake pressure regulation was performed.

3. The method as recited in claim 1, wherein an opening width of the partially closed inlet valve depends on a pressure difference of a brake pressure in the vehicle braking system and a wheel brake pressure in the wheel brake connected to the partially closed inlet valve.

4. The method as recited in claim 3, wherein for determining the pressure difference, the wheel brake pressure in the wheel brake is not measured, but is calculated or ascertained in another way.

5. The method as recited in claim 1, wherein the respective inlet valve of the one of the wheel brakes is closed to such an extent that a brake pressure is reached and/or maintained in the vehicle brake system, which is at least as high as a maximum setpoint wheel brake pressure of all wheel brakes.

6. The method as recited in claim 5, wherein an overrun of the power pressure generator during the partial closing of the respective inlet valve of the one of the wheel brakes is taken into account.

7. The method as recited in claim 1, wherein the respective inlet valve of the one of the wheel brakes, when in the partially closed state, remains open to such an extent that a maximum pressure in the vehicle braking system is not exceeded.

8. The method as recited in claim 1, wherein the power pressure generator includes an electric motor, a threaded drive, and a piston-cylinder unit, which is drivable via the threaded drive with the aid of the electric motor.

9. The method as recited in claim 1, wherein the respective inlet valve remains partially and not fully closed until the power pressure generator transitions into a standstill state.

10. The method as recited in claim 1, wherein the respective outlet valve of the one of the wheel brakes is a two-state valve that can only be in a fully opened state and a fully closed state.

11. A method for avoiding an exceedance of a permissible maximum pressure of a hydraulic vehicle power braking system including anti-slip regulation, the vehicle braking system including a power pressure generator, to which multiple hydraulic wheel brakes are connected via respective continuous inlet valves, which are connected via respective outlet valves to a brake fluid reservoir, the method comprising the following steps:
   generating a brake pressure in the vehicle braking system using the power pressure generator, for a power braking and/or for an anti-slip regulation; and
   performing a wheel brake pressure regulation by transitioning from a first state, in which the respective inlet valve of one of the wheel brakes is completely open, into a second state in which (a) the respective inlet valve remains partially and not fully closed and (b) the respective outlet valve of the one of the wheel brakes is completely open, the transitioning including partially, and not fully, closing the respective inlet valve of the one of the wheel brakes.

12. The method as recited in claim 11, wherein the power pressure generator is decelerated to a standstill while the respective outlet valve of the one of the wheel brakes is open in the second state.

13. The method as recited in claim 11, wherein an opening width of the partially closed inlet valve depends on a pressure difference of a brake pressure in the vehicle braking system and a wheel brake pressure in the wheel brake connected to the partially closed inlet valve.

14. The method as recited in claim 13, further comprising calculating or ascertaining the pressure difference without a measurement of the wheel brake pressure in the wheel brake.

15. The method as recited in claim 11, wherein the closing of the respective inlet valve of the one of the wheel brakes is to such an extent that a brake pressure is reached and/or maintained in the vehicle brake system, which is at least as high as a maximum setpoint wheel brake pressure of all wheel brakes.

16. The method as recited in claim 15, wherein an overrun of the power pressure generator during the partial closing of the respective inlet valve of the one of the wheel brakes is taken into account.

17. The method as recited in claim 11, wherein the respective inlet valve of the one of the wheel brakes, when in the partially closed state, remains open to such an extent that a maximum pressure in the vehicle braking system is not exceeded.

18. The method as recited in claim 11, wherein the power pressure generator includes an electric motor, a threaded drive, and a piston-cylinder unit, which is drivable via the threaded drive with the aid of the electric motor.

19. The method as recited in claim 11, wherein the respective inlet valve remains partially and not fully closed until the power pressure generator transitions into a standstill state.

20. The method as recited in claim 11, wherein the respective outlet valve of the one of the wheel brakes is a two-state valve that can only be in a fully opened state and a fully closed state.

* * * * *